United States Patent
Barnes et al.

(10) Patent No.: US 8,944,898 B2
(45) Date of Patent: Feb. 3, 2015

(54) GRAIN BIN EXTENSION DEPLOYMENT APPARATUS FOR AGRICULTURAL HARVESTING MACHINE

(71) Applicant: AGCO Corporation, Duluth, GA (US)

(72) Inventors: Erik L. Barnes, Peabody, KS (US); Robert Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 172 days.

(21) Appl. No.: 13/729,108

(22) Filed: Dec. 28, 2012

(65) Prior Publication Data

US 2013/0196724 A1 Aug. 1, 2013

Related U.S. Application Data

(60) Provisional application No. 61/581,709, filed on Dec. 30, 2011.

(51) Int. Cl.
*A01F 12/60* (2006.01)
*A01D 41/12* (2006.01)

(52) U.S. Cl.
CPC .................. *A01D 41/1226* (2013.01)
USPC ....................................................... 460/119

(58) Field of Classification Search
CPC ........... A01D 41/1226; A01D 41/1208; A01D 46/082; A01F 25/14
USPC ................... 460/119, 23, 114; 220/4.03, 6, 7; 296/26.07, 98, 15, 34
See application file for complete search history.

(56) References Cited

U.S. PATENT DOCUMENTS

| | | | | |
|---|---|---|---|---|
| 1,645,906 A * | 10/1927 | Hansen | ......................... | 100/226 |
| 3,771,531 A * | 11/1973 | Scribner | ......................... | 460/23 |
| 4,466,549 A * | 8/1984 | Hanaway | ...................... | 220/4.03 |
| 4,700,640 A * | 10/1987 | Andersson | ..................... | 111/186 |
| 4,960,300 A * | 10/1990 | Burvee | ........................... | 296/34 |
| 5,151,064 A * | 9/1992 | Damman et al. | ................. | 460/23 |
| 5,257,830 A * | 11/1993 | Pflueger | ........................... | 220/7 |
| 5,556,338 A * | 9/1996 | Covington | ..................... | 460/119 |
| 6,126,220 A * | 10/2000 | Brasher | ........................ | 296/26.04 |
| 6,206,779 B1 * | 3/2001 | Gerber et al. | ................... | 460/23 |
| 6,325,447 B1 * | 12/2001 | Kuo | ............................... | 296/165 |
| 6,508,705 B1 * | 1/2003 | Van Overschelde | ............ | 460/23 |
| 6,692,352 B2 * | 2/2004 | Gerber et al. | ................. | 460/119 |
| 6,752,715 B2 * | 6/2004 | Stephens et al. | ................ | 460/23 |
| 7,101,280 B2 * | 9/2006 | Colpaert | ....................... | 460/119 |

(Continued)

FOREIGN PATENT DOCUMENTS

EP 1197134 A1 * 4/2002 ............. A01D 41/12

*Primary Examiner* — Árpád Fábián-Kovács

(57) ABSTRACT

A grain bin located atop a harvester includes upstanding walls having a substantially continuous upper edge defining an opening. A grain bin extension is deployable between extended and retracted positions to expand the capacity of the grain bin. The extension includes extension panels and a cap overlaying the opening. The cap is supported by a cap frame that is also deployable between extended and retracted positions. An extension deployment apparatus raises and lowers the extension panels. Extension deployment mechanisms located at opposing corners of the grain bin control the deployment of adjacent extension panels. Each extension deployment mechanism has a first rack and a trunnion to drive extension panels in a vertical direction and pivot the panels in an outward direction and a second rack mounted to the trunnion to drive the cap frame in a vertical direction, and a drive gear between the first and second racks.

18 Claims, 7 Drawing Sheets

(56) References Cited

U.S. PATENT DOCUMENTS

| | | | |
|---|---|---|---|
| 7,118,165 B2 * | 10/2006 | Nelson et al. | 296/186.2 |
| 7,585,214 B1 * | 9/2009 | Johnson et al. | 460/119 |
| 7,645,109 B2 * | 1/2010 | Stukenholtz et al. | 414/505 |
| 8,029,346 B2 * | 10/2011 | Sprau | 460/23 |
| 8,113,565 B2 * | 2/2012 | Zeuner et al. | 296/32 |
| 8,146,974 B2 * | 4/2012 | Horst | 296/15 |
| 2006/0240884 A1 * | 10/2006 | Klimmer | 460/119 |
| 2008/0261671 A1 * | 10/2008 | Stukenholtz et al. | 460/114 |
| 2008/0261672 A1 * | 10/2008 | Stukenholtz et al. | 460/119 |
| 2008/0265601 A1 * | 10/2008 | Mohr et al. | 296/15 |
| 2009/0215509 A1 * | 8/2009 | Johnson et al. | 460/23 |
| 2011/0095554 A1 * | 4/2011 | Zeuner et al. | 296/15 |

* cited by examiner

GRAIN BIN EXTENSION DEPLOYMENT APPARATUS FOR AGRICULTURAL HARVESTING MACHINE

CROSS REFERENCE TO RELATED APPLICATIONS

This application claims priority to U.S. Provisional Application No. 61/581,709 filed Dec. 30, 2011, entitled "TRANSLATING GRAIN BIN EXTENSIONS FOR AGRICULTURAL HARVESTING MACHINE".

BACKGROUND OF THE INVENTION

1. Field of Invention

This invention relates generally to grain bins for agricultural harvesting machines such as combines, and in particular an extension for the grain bin to increase the capacity of such storage bins.

2. Description of Related Art

Harvesting and threshing machines, typically called combines, have an onboard storage bin for the collection and temporary storage of the harvested material. While it is desirable to increase the capacity of such storage bins, it is often necessary to transport the combine via roadways and thus it is desirable to maintain the height of the combine below a particular height during transport to avoid undesired contact and damage associated with overhead obstacles. Conversely, when in the field, there are very few overhead obstacles. It would, therefore, be desirable when the combine is in the field to increase the size of the storage bin so as to allow the combine to carry more harvested material onboard.

While it is known in the art to provide extension walls to the storage bin, such prior art bins typically involve extensions which collapse downward and inward for transport. One drawback associated with this orientation is the inability to provide the collapsible storage bin with a cover. As the dimensions of the top of the storage bin decreases as it collapses, any cover must typically be removed before the extension walls are collapsed, and reattached after the extension walls are expanded.

It would be desirable to provide an adjustable capacity grain bin to allow the bin to handle an increased amount of agricultural material in use, and to allow the height of the combine or other agricultural vehicle to which it is attached to have a decreased vertical height during transport. It would also be desirable to provide an expandable grain storage bin to which a cover may be attached and maintained during collapsing and expansion of the container.

OVERVIEW OF THE INVENTION

In one embodiment, the invention relates to a combine harvesting machine used for harvesting a crop and directing the harvested grain to a grain bin located atop the machine for receiving and holding the harvested grain. The grain bin includes upstanding walls including a forward wall, a rear wall opposite the forward wall, and opposed side walls extending between the forward and rear walls, wherein the upstanding walls have a substantially continuous, rectangular upper edge defining an upper end of grain bin and an upwardly facing rectangular opening. The grain bin has a grain bin extension about the upper edge configured to expand the capacity of the grain bin, the extension being deployable between an extended position in which the extension extends upwardly and outwardly from the upper edge of the grain bin for increasing the grain holding capacity thereof, and a retracted position, wherein the extension comprises extension panels. The grain bin also has a cap overlaying the opening of the grain bin. The cap is supported by a cap frame that is also deployable between an extended position such that the cap extends upwardly and outwardly from the upper edge of the grain bin, and a retracted position. An extension deployment apparatus is configured to raise and lower the extension panels between the extended and retracted positions. The extension deployment apparatus has two extension deployment mechanisms located at opposing corners of the grain bin such that each extension deployment mechanism controls the deployment of its two adjacent extension panels. Each extension deployment mechanism has a first rack and a trunnion to drive extension panels in a vertical direction and pivot the panels in an outward direction and a second rack mounted to the trunnion to drive the cap frame in a vertical direction, and an internal gear between the first and second racks to drive the raising and lowering of the extension, wherein the internal gear is connected to an extension drive source with an input shaft.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
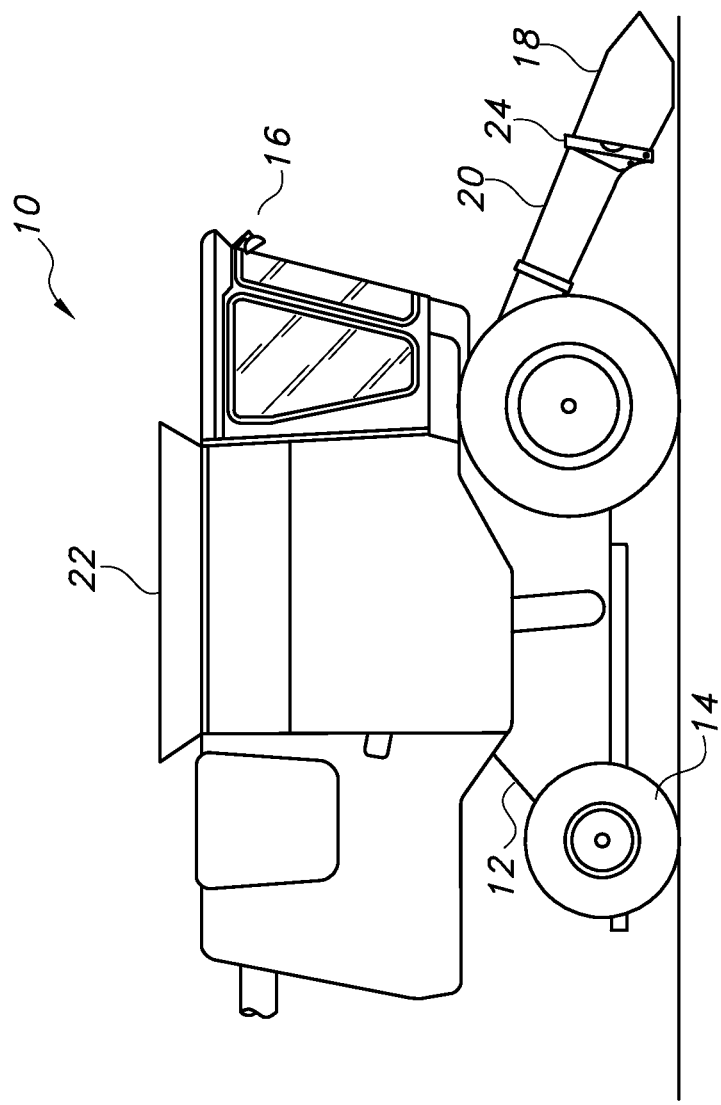
FIG. 1 is a simplified side view of a representative harvesting machine including a grain bin having extensions according to one embodiment of the invention.
Figure 2:
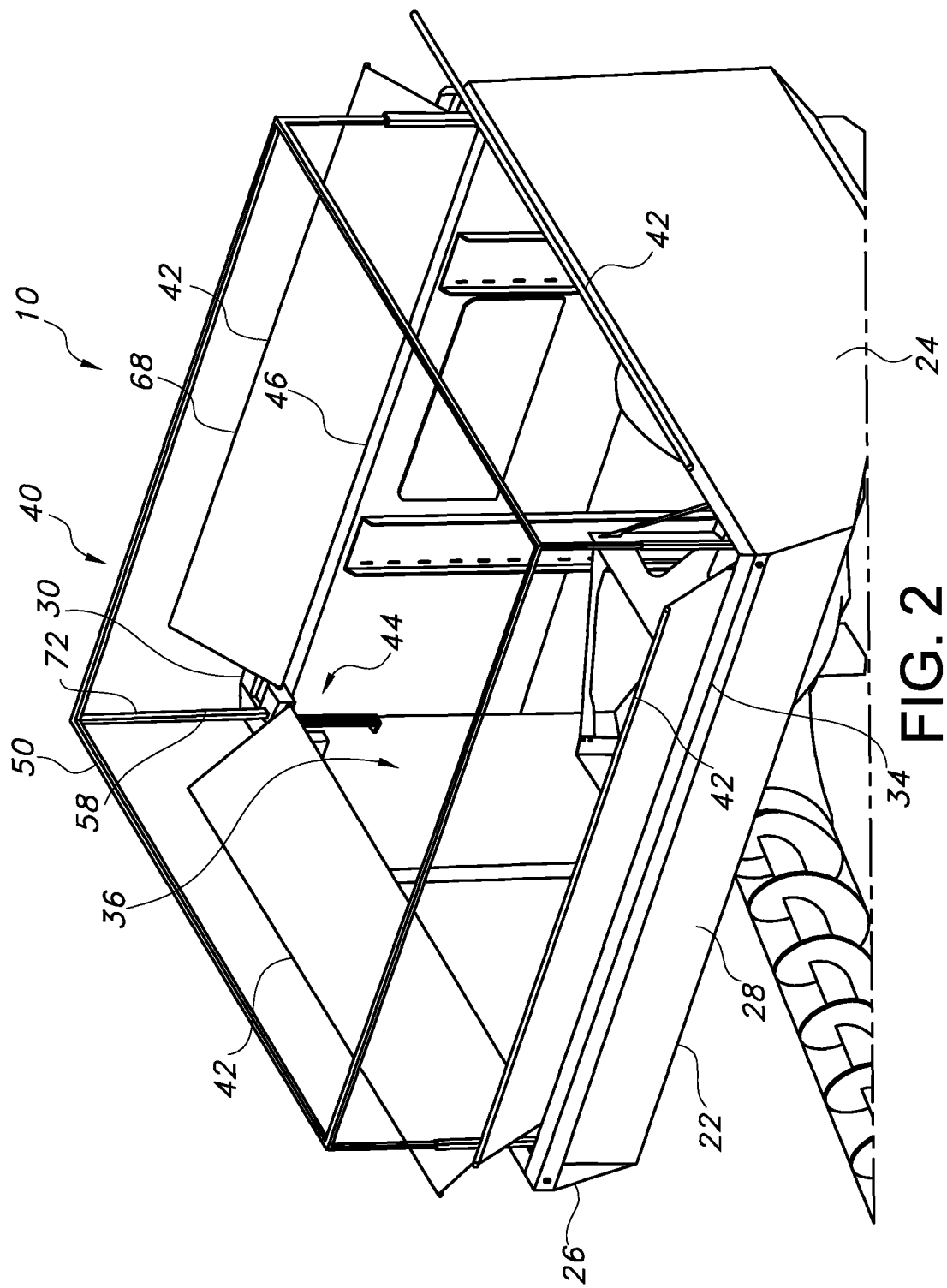
FIG. 2 is a simplified perspective view of the grain bin of FIG. 1 with the extensions in an extended condition.

Referring to the drawings in more detail, reference numeral 10 in FIG. 1 depicts a representative self-propelled combine harvesting machine 10, including apparatus for harvesting, cleaning and conveying clean grain, such as, but not limited to, corn, wheat, or soybeans. The combine harvesting machine 10 has a chassis that carries a propulsion unit 14, which may include tires and/or tracks that engage the ground and performs propulsion and steering functions. The operation of combine harvesting machine 10 is controlled from an operator's cab 16. In operation, a harvesting header 18 is used for harvesting a crop and directing the crop to a feederhouse 20. The harvested crop is directed during harvesting operation to a grain bin 22 located atop machine 10. Grain bin 22 includes a plurality of upstanding walls, including a forward wall 24, a rear wall 26 opposite forward wall 24, and opposed side walls 28 and 30 extending between forward and rear walls 24 and 26. Referring also to FIG. 2, walls 24, 26, 28, and 30 define the rectangular shaped grain bin 22 for receiving and holding grain harvested by the machine 10. Walls 24, 26, 28, and 30 additionally include a substantially continuous, rectangular upper edge 34 defining an upper end of grain bin 22 and an upwardly facing rectangular opening 36 to grain bin 22.

Upper edge 34 typically represents the highest or one of the highest points on a combine such as harvesting machine 10 relative to a surface 38 (FIG. 1) such as the ground or a road surface on which machine 10 is located. This height may be limited to a maximum value as dictated by a governmental entity for safe passage on public roads, or may be limited by the need to pass under bridges and/or utility wires. Even if the machine 10 is not operated on public roads, the height of the machine 10 may be limited by low hanging tree limbs or the height of a parking structure. Such a maximum height poses a difficulty insofar as it thus limits the height and, thus, the grain holding capacity of grain bin 22.

As a result, a problem that can arise, particularly when harvesting operations are being carried out in very large fields, the grain bin 22 may fill to its capacity before a section of a crop field being harvested has been completed, or when machine 10 is at a location within a field far from a grain truck or wagon into which the grain is to be unloaded, such that the harvesting operations must be undesirably interrupted, for a longer than desired time, for the unloading of the grain bin, which actions may require significant time expenditures to drive machine 10 to the unloading location, to unload it, and to then return it to the harvesting location.

Turning now to FIGS. 2-5, an extension 40 is placed about upper edge 34 to expand the capacity of a grain bin 22, thereby minimizing to some extent the down time that would otherwise be associated with more frequent interruptions for unloading of the grain bin 22. The extension 40 is deployable between an extended or raised position (FIGS. 2 and 3) extending upwardly and outwardly from the upper edge 34 of the grain bin 22 for substantially increasing the grain holding capacity thereof, and a retracted or lowered or stored position (FIGS. 4 and 5) so as to be more easily capable of meeting overall height limitations of machine 10 for travel over public roads and the like.

Figure 3:
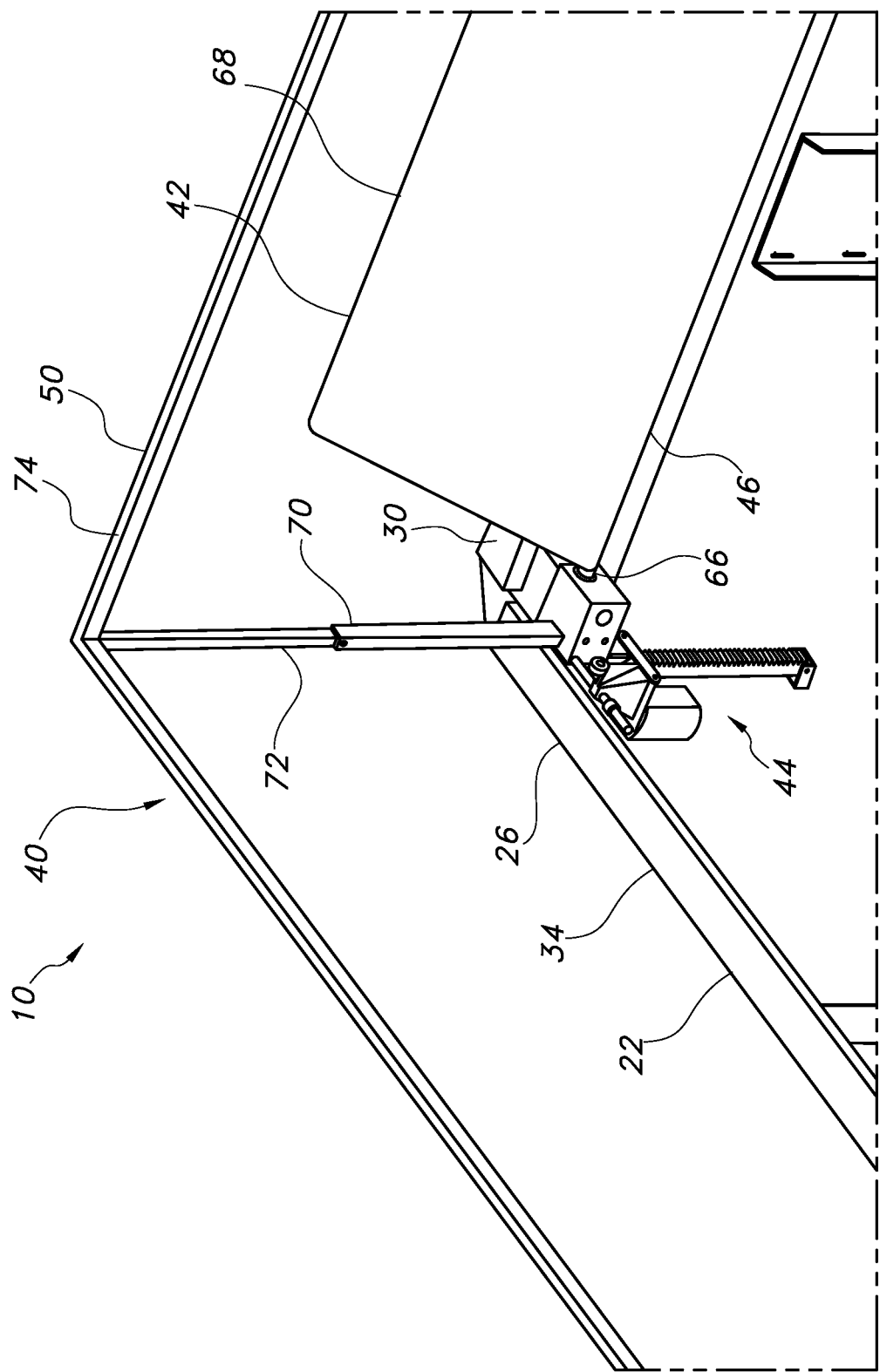
FIG. 3 is an enlarged simplified perspective view of portions of the grain bin of FIG. 2.
Figure 4:
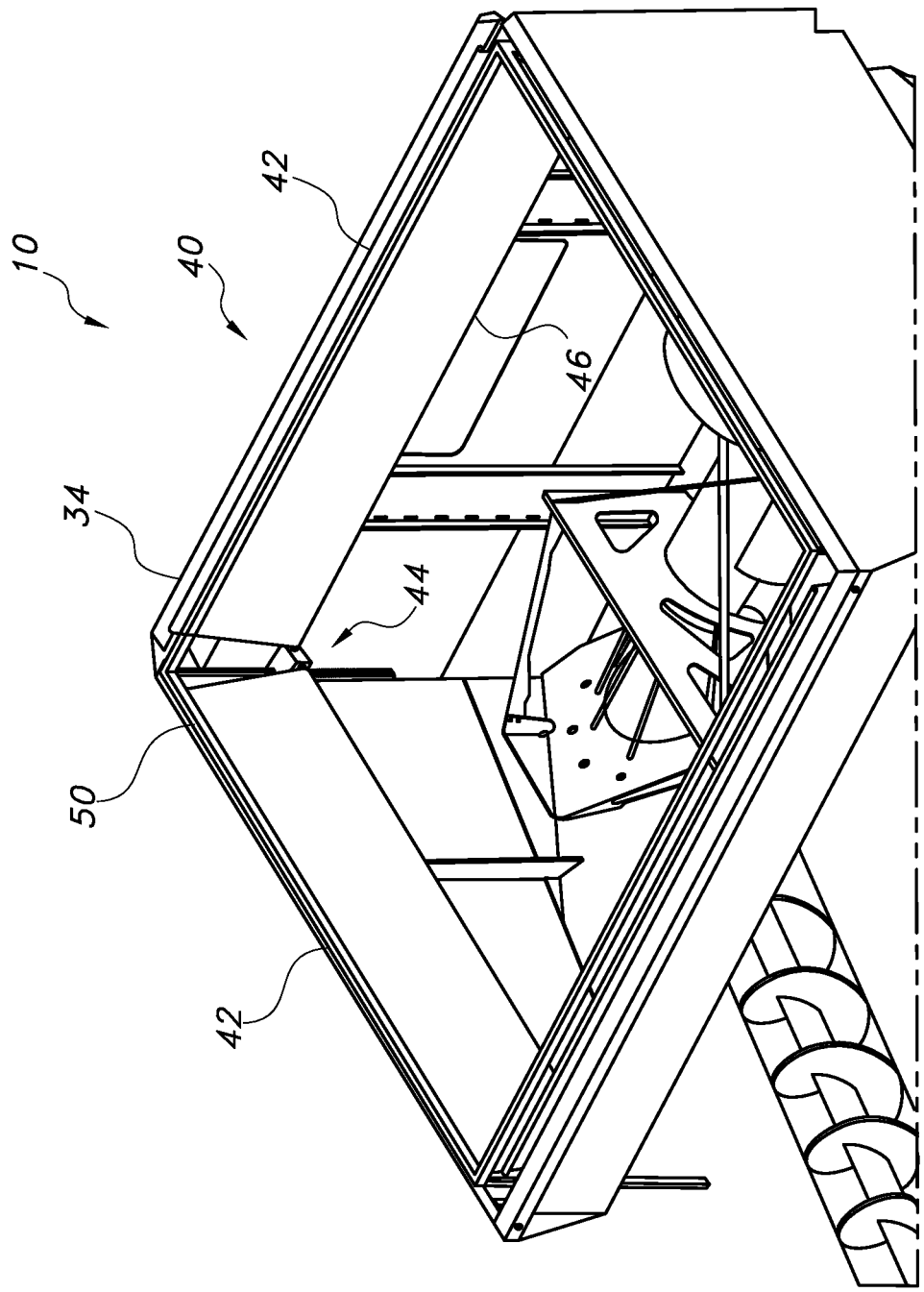
FIG. 4 is a simplified perspective view of the grain bin of FIG. 1 with the extensions in a retracted condition.

Extension 40 includes extension panels 42 preferably of substantially rigid material such as sheet metal, plastic, or another suitable material for the present application. The extension panels 42 are connected to the grain bin 22 and raised and lowered between the extended and retracted positions by extension deployment mechanisms 44. In the extended position, each panel 42 has a generally horizontal lower edge portion 46 positioned generally along that portion of upper edge 34 extending along respective wall 24, 26, 28, or 30. Desirably, the extension 40 also includes a cap 48 (FIG. 7) that overlays the opening 26 of the grain bin 22 to substantially cover the opening 36 in order to thereby protect the grain bin 22 from the introduction of rain and foreign materials and prevent wind from blowing harvested grain out of the grain bin 22. The cap 48 is supported by a cap frame 50 that is also deployable between an extended or raised position (FIGS. 2 and 3) such that the cap 48 extends upwardly and outwardly from the upper edge 34 of the grain bin 22, and a retracted or lowered or stored position (FIGS. 4 and 5).

In the illustrated embodiment, the extension 40 contains two extension deployment mechanisms 44 located at opposing corners of the grain bin 22 such that each extension deployment mechanism 44 controls the deployment of its two adjacent extension panels 42. Since the two extension deployment mechanisms 44 are desirably substantially identical, only one extension deployment mechanism 44 will be described herein. Turning now to FIGS. 3, 5 and 6, the extension deployment mechanism 44 includes a first rack 52 and a trunnion 54 to drive the extension panels 42 in a vertical direction and pivot the panels 42 in an outward direction. A second rack 58 mounted to the trunnion 54 drives the cap frame 50 in a vertical direction. The first rack 52 is fixed to one of the walls 24, 26, 28, or 30. As seen in FIG. 6, an internal gear 60 between the first and second rack 58s drives the raising and lowering of the extension 40. The internal gear 60 is connected to an extension drive 62 (FIG. 3) with input shaft 64. In one embodiment, the extension drive 62 is an electric motor. However, any known means to rotate the internal gear 60 may be used for the extension drive without departing from the scope of the invention.

Figure 5:
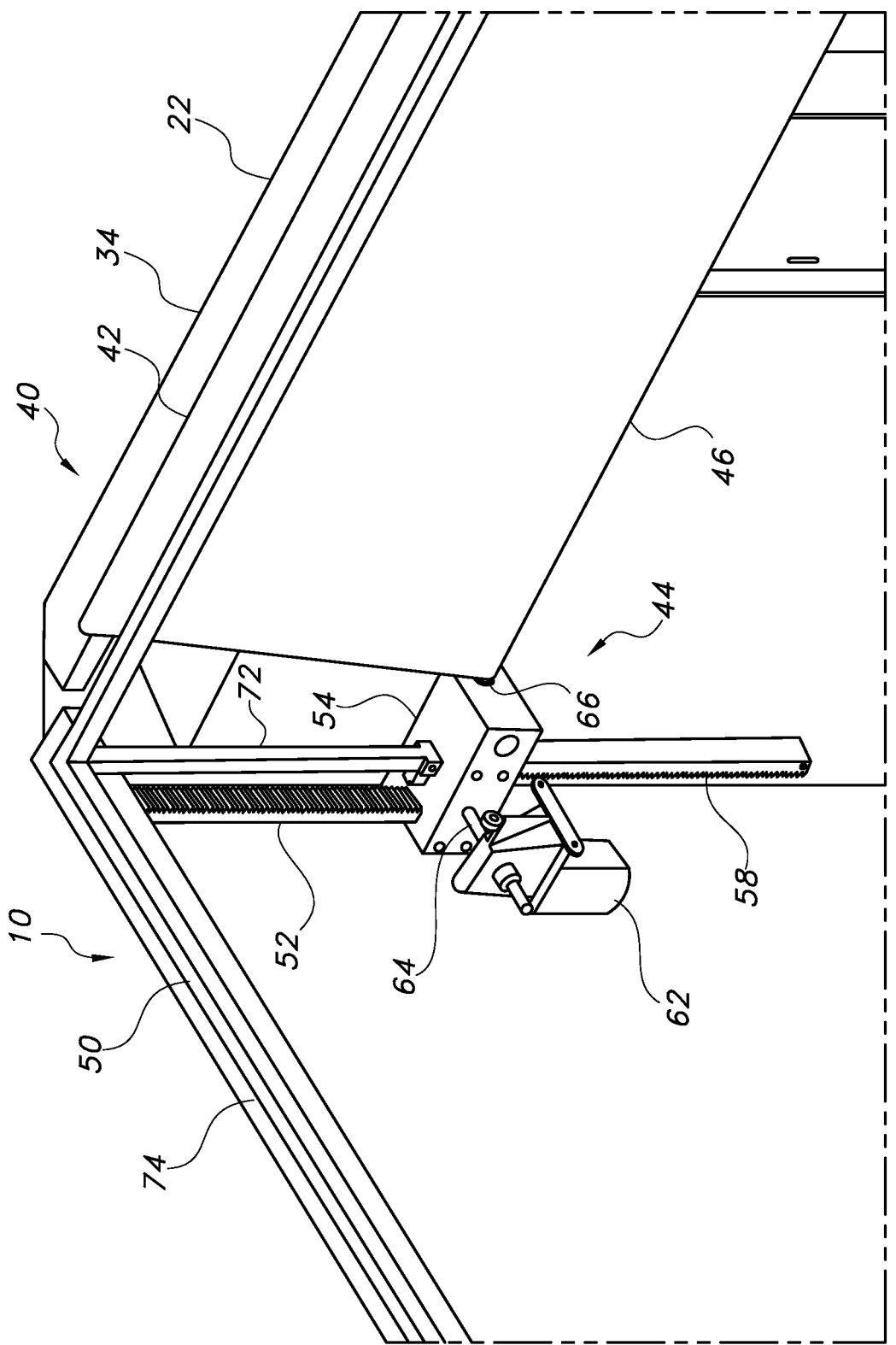
FIG. 5 is an enlarged simplified perspective view of portions of the grain bin of FIG. 4.
Figure 6:
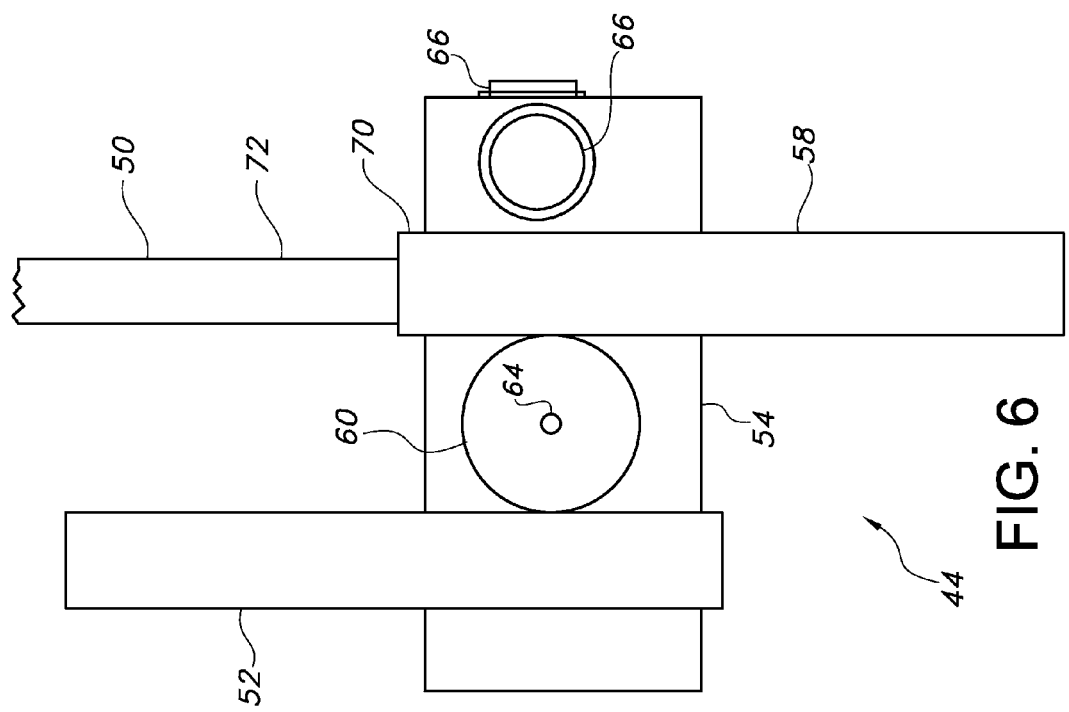
FIG. 6 is a simplified schematic view of racks and trunion 54 used by the extensions of the grain bin of FIG. 1.

Rotation of the internal gear 60 moves the trunnion 54 in the vertical direction on the fixed first rack 52 between the raised position as seen in FIG. 3 and the lowered position as seen in FIG. 5. Extension panels 42 are rotatable about an axis of rotation of a pivot member 66 connecting to the trunnion 54 generally along or adjacent to a bottom edge of the extension panel. Extension panels 42 deploy to an outward angled position as they are being translated upward. Desirably, the extension panels 42 are configured such that their center of gravity is positioned outward of the axis of the pivot member 66 so the upper edges 68 of the extension panels 42 open outward as the extension panels 42 are raised above the upper edge 34 of the grain bin 22. Thus, extension panels 42 pivot between an obtuse, interior angle to horizontal as in FIGS. 2 and 3, and a retracted substantially vertical position as shown in FIGS. 4 and 5.

Figure 7:
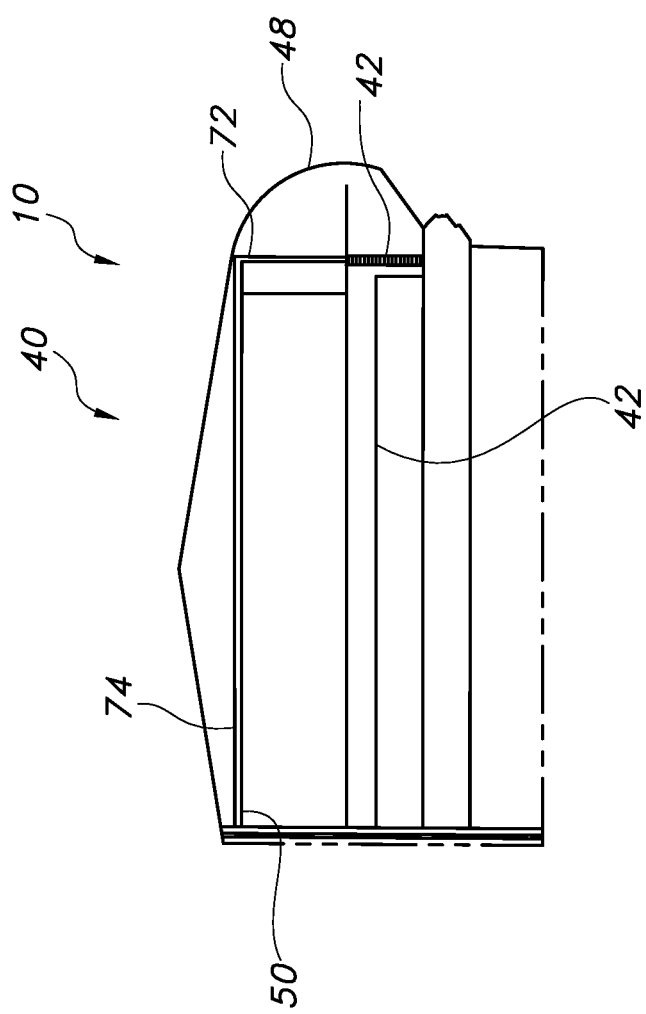
FIG. 7 is a side view of the grain bin of FIG. 1.

The cap frame 50 is mounted to distal end 70 of the second rack 58. In one embodiment, cap frame 50 comprises vertical lift members 72 connected to the second rack 58 and horizontal support members 74 forming a rectangular structure that supports the cap 48 over the opening 36. Rotation of the internal gear 60 also moves the second rack 58 with respect to the trunnion 54. As rotation of the internal gear 60 also moves the trunnion 54, both components contribute to vertical movement of the cap frame 50 so that in the illustrated embodiment, the cap frame 50 moves twice the vertical distance as the extension panels 42. In one embodiment, sides of the cap 48 are attached to the extension panels 42 such that the outer edges of the cap 48 billow outward with deployment of the extension panels 42 as seen in FIG. 7. The cap 48 extends between and encloses the corner gaps located between the adjacent panels 42. The cap 48 may take various forms and be constructed of various know flexible materials as understood by one skilled in the art to facilitate the raising and lowering of the cap 48 with the extension 40.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A combine harvesting machine used for harvesting a crop and directing the harvested grain to a grain bin located atop the machine for receiving and holding said harvested grain, said grain bin comprising:
    upstanding walls comprising a forward wall, a rear wall opposite said forward wall, and opposed side walls extending between said forward and rear walls, wherein said upstanding walls comprise a substantially continuous, rectangular upper edge defining an upper end of grain bin and an upwardly facing rectangular opening;
    a grain bin extension about said upper edge configured to expand the capacity of said grain bin, said extension being deployable between an extended position in which said extension extends upwardly and outwardly from said upper edge of the grain bin for increasing the grain holding capacity thereof, and a retracted position, wherein said extension comprises extension panels;
    a cap overlaying the opening of the grain bin, said cap supported by a cap frame that is also deployable between an extended position such that the cap extends upwardly and outwardly from the upper edge of the grain bin, and a retracted position;
    extension deployment apparatus configured to raise and lower the extension panels between said extended and retracted positions, said extension deployment apparatus comprising two extension deployment mechanisms located at opposing corners of the grain bin such that each extension deployment mechanism controls the deployment of its two adjacent extension panels, each extension deployment mechanism comprising a first rack fixed to one of the upstanding walls and a trunnion movable on the first rack, wherein the two adjacent extension panels are pivotally connected to the trunnion, such that movement of the trunnion on the first rack drives the extension panels in a vertical direction and pivots the panels in an outward direction, and a second rack mounted to the trunnion, the cap frame being connected to the cap frame, such that movement of the second rack with respect to the trunnion drives the cap frame in a vertical direction, and an internal gear between the first and second racks to drive the raising and lowering of the extension, wherein rotation of the internal gear moves the second rack with respect to the trunnion, and also moves the trunnion with respect to the fixed first rack such that both the movement of the trunnion with respect to the first rack and movement of the second rack with respect to the trunnion contribute to vertical movement of the cap frame, wherein the internal gear is connected to an extension drive source with an input shaft.

2. The combine harvesting machine of claim 1 wherein rotation of the internal gear causes the cap frame to move twice the vertical distance as the extension panels.

3. The combine harvesting machine of claim 1 wherein rotation of the internal gear moves the trunnion in the vertical direction on the fixed first rack between the raised position and the lowered position.

4. The combine harvesting machine of claim 1 wherein extension panels are rotatable about an axis of rotation of a pivot member connecting to the trunnion generally along or adjacent to a bottom edge of the extension panel.

5. The combine harvesting machine of claim 1 wherein the extension panels are configured such that their center of gravity is positioned outward of the axis of the pivot member so the upper edges of the extension panels open outward as the extension panels are raised above the upper edge of the grain bin.

6. The combine harvesting machine of claim 1 wherein the extension panels pivot between an obtuse interior angle to horizontal and a substantially vertical position.

7. The combine harvesting machine of claim 1 wherein the cap frame is mounted to a distal end of the second rack.

8. The combine harvesting machine of claim 1 wherein the cap frame comprises vertical lift members connected to the second rack and horizontal support members forming a rectangular structure that supports the cap over the opening.

9. The combine harvesting machine of claim 1 wherein in the extended position, each panel has a generally horizontal lower edge portion positioned generally along a portion of upper edge extending along respective upstanding wall.

10. The combine harvesting machine of claim 1 wherein the extension drive source is an electric motor.

11. The combine harvesting machine of claim 1 wherein sides of the cap are attached to the extension panels such that the outer edges of the cap billow outward with extension of the extension panels.

12. A grain bin located atop a harvester comprising:
    upstanding walls having a substantially continuous upper edge defining an opening;
    a grain bin extension deployable between extended and retracted positions to expand the capacity of the grain bin, the grain bin extension comprising a plurality of extension panels and a cap overlaying the opening, the cap supported by a cap frame that is also deployable between extended and retracted positions;
    an extension deployment apparatus configured to raise and lower the grain bin extension, said apparatus comprising extension deployment mechanisms located at opposing corners of the grain bin to control the deployment of adjacent extension panels, wherein each extension deployment mechanism has a first rack mounted on one of the upstanding walls and a trunnion movable on the first rack, wherein the two adjacent extension panels are pivotally connected to the trunnion, such that movement of the trunnion on the first rack drives the extension panels in a vertical direction and pivots the panels in an outward direction, and a second rack mounted to the trunnion, the cap frame being connected to the cap frame, such that movement of the second rack with respect to the trunnion drives the cap frame in a vertical direction, wherein the cap frame is mounted to a distal end of the second rack, and a dive gear between the first and second racks, wherein rotation of the drive gear moves the second rack with respect to the trunnion, and also moves the trunnion with respect to the fixed first rack such that both the movement of the trunnion with respect to the first rack and movement of the second rack with respect to the trunnion contribute to vertical movement of the cap frame.

13. The grain bin of claim 12 wherein rotation of the internal gear moves the trunnion in the vertical direction on the fixed first rack between the raised position and the lowered position.

14. The grain bin of claim 12 wherein extension panels are rotatable about an axis of rotation of a pivot member connecting to the trunnion generally along or adjacent to a bottom edge of the extension panel.

15. The grain bin of claim 12 wherein the extension panels are configured such that their center of gravity is positioned outward of the axis of the pivot member so the upper edges of the extension panels open outward as the extension panels are raised above the upper edge of the grain bin.

16. The grain bin of claim 12 wherein the cap frame comprises vertical lift members connected to the second rack and horizontal support members forming a rectangular structure that supports the cap over the opening.

17. The grain bin of claim 12 wherein rotation of the internal gear moves the second rack with respect to the trunnion and also moves the trunnion such that both components contribute to vertical movement of the cap frame.

18. The grain bin of claim 17 wherein rotation of the internal gear causes the cap frame to move twice the vertical distance as the extension panels.

* * * * *